Patented May 21, 1929.

1,713,669

UNITED STATES PATENT OFFICE.

ROBERT B. MacMULLIN, OF LA SALLE, AND ANTHONY GEORGE, OF NIAGARA FALLS, NEW YORK, ASSIGNORS TO THE MATHIESON ALKALI WORKS, INC., OF NEW YORK, N. Y., A CORPORATION OF VIRGINIA.

MANUFACTURE OF CALCIUM HYPOCHLORITE.

No Drawing.   Application filed August 4, 1926.   Serial No. 127,175.

This invention relates to improvements in the production of calcium hypochlorite. Calcium hypochlorite, that is $Ca(OCl)_2$, in pure form is relatively stable, but calcium chloride if present in substantial amount makes it relatively unstable. This is apparently due to the hygroscopic properties of calcium chloride. This invention provides an improved method of making calcium hypochlorite products of high purity, particularly with reference to contamination with calcium chloride, and which may be made relatively free from lime. The invention has several further important advantages.

According to the present invention, milk of lime is first chlorinated, for example, up to or beyond the point where calcium hypochlorite begins to precipitate. Caustic alkali is then added to the chlorinated slurry and the chlorination continued, advantageously to a point such that the resulting mixture is substantially free from both calcium chloride and alkali hypochlorite. When caustic alkali is added to the chlorinated lime slurry, lime is precipitated in a form which is easily chlorinated. Further chlorination, after the addition of caustic alkali, converts this lime to calcium hypochlorite and calcium chloride, and the calcium chloride so formed is converted to calcium hypochlorite by the action of alkali hypochlorite also present in the resulting mixture. Alkali chloride is formed which may, in varying proportions, be associated with calcium hypochlorite in the product, but unlike calcium chloride, alkali chloride apparently does not adversely affect the stability of calcium hypochlorite.

To produce a product containing a minimum of alkali chloride, it is advantageous to regulate the concentration of the slurry so that all of the alkali chloride is still in solution when chlorination is completed. For example, if milk of lime is chlorinated just up to the point where the precipitation of calcium hypochlorite begins, an aqueous solution containing 55% by weight of sodium hydroxide is then added and the chlorination continued, slurries free from precipitated salt, that is sodium chloride, can be produced. The precipitated calcium hypochlorite can then be separated from the slurry in any suitable manner, for example by filtration either with or without pressing. If chlorination of the milk of lime is carried much beyond the point where calcium hypochlorite begins to precipitate or if a caustic soda solution containing much less than 45% by weight of water is used, some salt is present in the solid phase in the slurry.

To obtain a very pure product, with particular reference to impurities present in the lime used, it is advantageous to separate insoluble material from the chlorinated lime slurry before caustic alkali is added. This separation may be made, for example, by settling or by filtration. While this step is not essential, it is particularly advantageous if it is desired to produce a product that will leave but a slight if any residue on dissolving in water.

The invention will be illustrated by the following example: 249 pounds of high grade lime (95% $Ca(OH)_2$) are mixed with 1060 pounds of water, and the slurry is chlorinated until it contains less than about 1% by weight of calcium hydroxide. A solution containing 256 pounds of caustic soda dissolved in 209 pounds of water is then added to the chlorinated slurry, and chlorination of the mixture is continued until less than about 1% of free alkali remains. A total of about 456 pounds of chlorine is required. The final slurry contains something in the neighborhood of 60% of the total calcium hypochlorite present in the solid phase. This precipitated calcium hypochlorite may be filtered off and dried either with or without pressing. The filtrate may be used for bleaching purposes, or treated with lime to recover available chlorine as a precipitated basic calcium hypochorite, which may be employed in making up the lime slurry for chlorination in a subsequent cycle of the operation. Any excess lime, precipitated with the basic calcium hypochlorite is also returned to the operation in this event. It will be apparent that, in such operation, allowance must be made for calcium, chlorine and water so supplied to the operation.

It will be apparent that the invention provides a method of making calcium hypochlorite products which has several advantages. It enables the production, by direct chlorination methods, of a calcium hypochlorite product substantially free from calcium chloride and of improved stability. It also enables the production of calcium hypochlorite products relatively low in lime. Another important advantage of the invention is that it materially facilitates the progress of the chlorination, particularly as complete chlorination is approached and after the addition of caustic alkali. The invention also enables the production of a calcium hypochlorite product of very high solubility.

We claim:

1. A process of making calcium hypochlorite which comprises chlorinating milk of lime, adding caustic alkali to the chlorinated lime slurry, continuing the chlorination and separating calcium hypochlorite from the resulting mixture.

2. A process of making calcium hypochlorite which comprises chlorinating milk of lime, adding caustic soda to the chlorinated lime slurry, continuing the chlorination and separating calcium hypochlorite from the resulting mixture.

3. A process of making calcium hypochlorite which comprises chlorinating milk of lime approximately to the point where calcium hypochlorite just begins to precipitate, adding caustic alkali to the chlorinated lime slurry, continuing the chlorination and separating calcium hypochlorite from the resulting mixture.

4. A process of making calcium hypochlorite which comprises chlorinating milk of lime, adding caustic alkali to the chlorinated lime slurry while maintaining the concentration such that all sodium chloride present is in solution, continuing the chlorination and separating calcium hypochlorite from the resulting mixture.

5. A process of making calcium hypochlorite which comprises chlorinating milk of lime, separating insoluble material, adding caustic alkali to the chlorinated lime slurry from which insoluble material has been separated, continuing the chlorination and separating calcium hypochlorite from the resulting mixture.

In testimony whereof we affix our signatures.

ROBERT B. MacMULLIN.
ANTHONY GEORGE.